United States Patent
Neppl et al.

(10) Patent No.: US 6,939,601 B2
(45) Date of Patent: Sep. 6, 2005

(54) CLEAR LACQUER COAT

(75) Inventors: Bernhard Neppl, Cologne (DE); Johannes Boysen, Cologne (DE)

(73) Assignee: Bollig & Kemper GmbH & Co. KG, Cologne (DE)

( * ) Notice: Subject to any disclaimer, the term of this patent is extended or adjusted under 35 U.S.C. 154(b) by 0 days.

(21) Appl. No.: 10/433,249

(22) PCT Filed: Nov. 30, 2001

(86) PCT No.: PCT/DE01/04480

§ 371 (c)(1),
(2), (4) Date: Nov. 10, 2003

(87) PCT Pub. No.: WO02/44237

PCT Pub. Date: Jun. 6, 2002

(65) Prior Publication Data

US 2004/0121160 A1 Jun. 24, 2004

(30) Foreign Application Priority Data

Nov. 30, 2000 (DE) .......................................... 100 59 856

(51) Int. Cl.⁷ ................................................ B32B 7/02
(52) U.S. Cl. .................... 428/212; 428/421; 428/423.1; 428/424.4
(58) Field of Search .............................. 427/372.2, 379, 427/388.2; 428/212, 423.1, 424.4, 421

(56) References Cited

U.S. PATENT DOCUMENTS

| | | | |
|---|---|---|---|
| 4,720,405 A | 1/1988 | Carson et al. .............. | 427/410 |
| 5,169,915 A | 12/1992 | Mohri et al. ................ | 526/247 |
| 5,229,214 A | 7/1993 | Maze et al. ................. | 428/458 |
| 5,929,158 A | 7/1999 | Matsuno et al. ............ | 524/520 |
| 5,948,851 A | 9/1999 | Anton et al. ................ | 524/520 |
| 6,159,549 A * | 12/2000 | Sundararaman et al. .... | 427/410 |
| 2004/0063851 A1 * | 4/2004 | Neppl et al. ................ | 524/589 |

FOREIGN PATENT DOCUMENTS

| | | | |
|---|---|---|---|
| DE | 195 08 544 A1 | 9/1996 | ............. C08F/8/14 |
| DE | 198 57 465 A1 | 5/2000 | ......... C09D/151/08 |
| EP | 0 568 967 B1 | 11/1993 | ............. B05D/3/00 |
| WO | WO 99/31186 | 6/1999 | ............. C09D/5/00 |

* cited by examiner

Primary Examiner—D. Lawrence Tarazano
(74) Attorney, Agent, or Firm—Fish & Richardson P.C.

(57) ABSTRACT

Clear coat layer obtainable by:
(I) applying an unpigmented intermediate coat to a substrate to be coated;
(II) crosslinking the intermediate coat and forming an intermediate coat layer;
(III) applying an unpigmented top-coat to the intermediate coat layer and
(IV) Crosslinking the top-coat and forming a top-coat layer;

the intermediate coat layer having a greater flexibility than the top-coat layer, as well as its use in the production of a multilayer coating.

33 Claims, No Drawings

CLEAR LACQUER COAT

The present invention relates to a clear coat layer, which is suitable in particular for the production of a multilayer coating in the automotive industry.

In addition to having decorative properties such as imparting color, gloss, etc., coating of motor vehicles fulfills protective functions in particular with regard to a wide variety of environmental and weather influences, such as acid rain, UV radiation, etc.

However, preventing corrosion of the metal by means of the coating film is of primary concern, whereby the protective function of the coating film should be guaranteed even under adverse circumstances such as UV radiation, resistance to the impact of stones, mechanical effects (vehicle wash facilities), etc.

These increased requirements have resulted in the use of multilayer coatings in the automotive industry.

The most commonly used multilayer coating is the so-called four-layer coating described below, consisting of four coating layers, each having a different composition and method of application.

The first layer applied directly to the pretreated automobile sheet metal is a layer applied electrophoretically (electrocoat layer, cathodic dip coating layer) which is applied by electrodeposition coating—mainly cathodic dip coating (CDC)—for the purpose of preventing corrosion and subsequently baked on.

The second layer applied on top of the electrocoat layer and approximately 20 to 40 $\mu$m thick is a so-called primer layer which, on the one hand, provides protection against mechanical attack (function of protecting from impact of stones) while, on the other hand, it smooths the rough surface of the body shell for subsequent top coating, fills minor irregularities and protects the electrophoretically deposited layer (cathodic dip coating layer) from natural UV radiation. This layer is created largely by applying a baked-on coating, e.g. by electrostatic high rotation bells and subsequent baking at temperatures above 130° C.

The third layer applied on top of the primer layer is the so-called base-coat layer, which imparts the desired color to the automobile body by appropriate pigments. The base coat is applied by the conventional spray method. The layer thickness of this conventional base-coat layer is approximately 12 to 25 $\mu$m, depending on the tint. In most cases, this layer is applied in two process steps, e.g. in a first step by application by means of electrostatic high rotation bells followed by a second application by means of pneumatic atomization. This layer is subsequently subjected to intermediate drying with infrared lamps and/or hot air convection.

The fourth and top-most layer applied on top of the base-coat layer is the clear coat layer, which is usually applied in one operation by means of electrostatic high-rotation bells. It imparts the desired gloss to the automobile body and protects the base-coat from environmental effects (UV radiation, salt water, etc.). The layer thickness is usually between 30 and 50 $\mu$m.

Subsequently, the base-coat layer and the clear coat layer are baked jointly at a temperature between 130° C. and 160° C.

Furthermore, it is known from European Patent 568 967 B1 that automobile body precoated with a color-imparting base-coat layer may be coated with two layers of clear coat, the bottom-most clear coat layer of which being heat curable and the top-most clear coat layer being radiation curable. An application of this multilayer system to substrates to be shaped subsequently is not mentioned.

A major disadvantage in the production of this four-layer coating is that it is equipment-intensive and therefore cost-intensive because of the different application methods used.

In addition, the use of coatings for the spray application is no longer appropriate for reasons of environmental policy because considerable quantities of overspray arise during such coating operations.

Moreover, because of the shape of the automobile body, differences in tint and different top-coat states may be observed, which cannot be prevented in conjunction with the multilayer system described above.

The automotive industry therefore endeavors to replace the parts of the sheet metal outer of the automobile body which must be coated, e.g. the bonnet, the boot cover, doors, etc. by parts already fully coated in the color of the vehicle to minimize the disadvantages described above.

An important prerequisite for this process is the use of so-called precoated coils. These coils of metal precoated in the color of the vehicle which can be converted to the desired shape by the automobile manufacturer by appropriate shaping methods (deep drawing) in the coated state. No additional coating is thus necessary.

From U.S. Pat. No. 5,229,214, for example, it is known to apply two different primer layers onto a galvanized steel coil before shaping, the top layer having a greater flexibility than the first layer beneath it.

Subsequently, the color-imparting base-coat layer and a clear coat layer are applied to this "double" primer layer.

A major disadvantage of the precoated coils used in the past is that even before shaping, the coating structure does not conform to the properties required by the automotive industry with regard to gloss and appearance.

Furthermore, it was impossible to reproduce the tints demanded by the automotive industry. In particular in the case of effect coatings, the development of roller structures visible to the naked eye could not be prevented when using precoated coils. Furthermore, the development of an effect (flop effect) in the mass-produced coating could not be repeated.

These are the main reasons why coils precoated in the color of the vehicle are not being used for mass production of motor vehicles.

The latest developments in the automotive industry are moving increasingly in the direction of modular design, where the automobile manufacturer simply fits the modules manufactured by outside companies to the motor vehicle.

The term "module" should be understood to refer to such parts of the motor vehicle which are prefabricated by a supplier for the automobile manufacturer and are completely functional when taken alone. Examples of this include ready-to-install seats, fully wired dashboards etc.

Because of the available coating technology, it has not been possible so far to market body parts pre-coated in the color of the vehicle or outer shell modules.

The object of the present invention is to provide a clear coat layer which is suitable for the production of precoated metal coils from which parts for motor vehicles can be manufactured by appropriate shaping methods (deep drawing).

This clear coat layer should be suitable in particular for the production of coils pre-coated in the color of the vehicle which conform to the properties required by the automotive industry with respect to gloss and appearance.

This object is achieved by a clear coat layer obtainable by:

(I) applying an unpigmented intermediate coat to a substrate to be coated;

(II) crosslinking the intermediate coat and forming an intermediate coat layer;

(III) applying an unpigmented top-coat to the intermediate coat layer, and (IV) crosslinking the top-coat and forming a top-coat layer, the intermediate coat layer having a greater flexibility than the top-coat layer.

However, the object according to the invention is also achieved by a clear coat layer obtainable by:

(I) applying an unpigmented intermediate coat to a color-imparting base-coat layer;

(II) crosslinking the intermediate coat and forming an intermediate coat layer;

(III) applying an unpigmented top-coat to the intermediate coat layer and (IV) crosslinking the top-coat and forming a top-coat layer, the intermediate coat layer having a greater flexibility than the top-coat layer.

With the clear coat layer according to the invention, it is possible for the first time to provide metal coils precoated in the color of the vehicle which can be used for the production of automobile body outer shell parts or corresponding modules which satisfy the requirements of the automotive industry with regard to appearance and color.

In addition, the clear coat layer according to the invention also satisfies the other requirements regarding an automobile series coating such as mechanical resistance to stress.

The clear coat layer according to the invention has two major differences in comparison with a "double clear coat layer" in which two layers have been produced from the same coating. Firstly, the clear coat layer according to the invention has an improved flexibility, and secondly, the adhesion between the coat layer and the top-coat layer is so good that it is possible to provide a multilayer coating for metal coils precoated in the color of the vehicle by way of the system according to the invention. In the case of a "double clear coat layer" the adhesion is so inadequate that it is manifested by the top-most layer splintering off after a shaping of a precoated metal coil by deep drawing.

In addition the appearance of a clear coat layer composed of two different unpigmented coatings each having a layer thickness of 15 µm is better than that of a single layer having a thickness of 30 µm.

The term "unpigmented" as used here and below should be understood to refer to such coatings which do not comprise any color-imparting pigments.

Color-imparting pigments include in particular absorption pigments and/or fillers, e.g. titanium dioxide, iron oxide pigments, carbon black, silicon dioxide, azo pigments, phthalocyanine pigments, quinacridone pigments, diketopyrrolopyrrole pigments, pearlescent pigments, indanthrone pigments, talc, mica, kaolin, chalk, barium sulfate, various silicas, silicates and organic fibers.

The term "unpigmented coating," however also includes coatings which comprise effect pigments.

According to another particularly preferred embodiment, the intermediate coat layer has a greater flexibility than the top-coat layer. The flexibility of the intermediate coat layer may be between T0 and T2, that of the top-coat layer between T0.5 and T5 determined according to the T-bend test. Details regarding the T-bend test are given in the examples.

The value of the flexibility of the top-coat layer, determined according to the T-bend test, should preferably be 0.5 to 4 units, in particular at least two units higher than that of the intermediate coat layer.

According to a preferred embodiment of the present invention, the top-coat of the clear coat layer is obtainable by polyaddition of a non-aqueous starting mixture comprising:

(A) 10 wt. % to 70 wt. % of a non-aqueous solution of a polymer based on acrylate with an OH number between 100 and 250.

(B) 10 wt. % to 70 wt. % of a non-aqueous solution of a fluorine-modified polymer having a glass transition temperature between 20 and 40° C., and (C) 20 wt. % to 60 wt. % of at least one blocked aliphatic or cycloaliphatic polyisocyanate; the weight ratio of component (A) to component (B) amounting to at most 1, and the sum of the components (A), (B), and (C) amounting to 100%, based on the binder content of the starting mixture to be crosslinked.

This yields an excellent resistance to chemicals and weathering of the finished clear coat layer, which is better than that of a clear coat produced only on the basis of fluoropolymer resin according to the state of the art.

Even better results with respect to gloss are achieved with such a clear coat layer according to the invention in which component is obtainable by radical polymerization of a monomer mixture comprising the following components:

(i) 0 30 wt. % to 60 wt. % of at least one polycycloaliphatic compound with at least two rings and a refractive index of at least 1.460 at 20° C., (ii) 25 wt. % to 70 wt. % of at least one $C_2$–$C_4$ hydroxyalkyl (meth)acrylate with primary hydroxyl groups, and (iii) 0.1 to 1 wt. % acrylic acid, the sum of components (i), (ii), and (iii) amounting to 100 wt. %, based on the monomer mixture.

When using this special non-aqueous solution of a polymer based on acrylate, the other properties of a coating film obtained by crosslinking a corresponding clear coat layer are not impaired; in particular its mechanical properties (resistance to impact by stones, hardness and flexibility) and its resistance to chemicals satisfy the high requirements of the automotive industry with respect to a clear coat.

A polycycloaliphatic substance comprising a carboxyl group is understood in the context of the present invention to refer to a substance or a compound which has a polycarboxylic structure or substructure, i.e., the rings are only carbocycles. The designation (meth) in (meth)acrylic as used here and below indicates that it includes both the methacrylic compounds and the acrylic compounds.

With regard to the relationship between refractive index and gloss, reference is made to the article by Juergen H. Braun in Journal of Coatings Technology, Vol. 63, No. 799, August 1991.

With respect to the relationship between the refractive index and temperature, reference is made to Organikum, Autorenkollektiv [Organic Chemistry, various authors], VEB Deutscher Verlag der Wissenschaften, 16th edition, Berlin 1986, p. 76 f.

For substances which are not liquid at 20° C., the refractive index can be determined at an elevated temperature by using a thermostatically regulated Abbé refractometer with the light of the sodium D line λ=589 nm. The increment used for correction of temperature is addition: of 5·10-4 units per ° C.

Radical polymerization of component (1) is a current method with which those skilled in the art are familiar.

The monomer mixture used in the top-coat layer may additionally comprise 5 wt. % to 25 wt. % of a vinyl ester of a branched monocarboxylic acid having an average of 9 carbon atoms.

Such vinyl esters are conventional commercial products and are available, e.g. under the brand name VeoVa9 from Shell.

The use of such vinyl esters is advantageous when high demands are made of the hardness and resistance to chemicals.

Especially good results are achieved when isobornyl methacrylate is used as the polycycloaliphatic compound.

The resulting clear coat layers have excellent properties with regard to gloss and resistance to chemicals.

Likewise, very good results can be observed when the polycycloaliphatic compound of component (i) is selected from an acrylic copolymer obtainable by modifying an acrylic copolymer having at least one epoxy group with a polycycloaliphatic substance having at least two rings and one carboxyl group with a refractive index of at least 1.460 at 20° C., the epoxy group originating from glycidyl methacrylate.

This special polycycloaliphatic compound of component (i) may be used alone or in mixture with other polycycloaliphatic compounds to produce a non-aqueous solution of a polymer based on acrylate.

The use of such a polycycloaliphatic compound having a glycidyl methacrylate radical in mixture with isobornyl methacrylate is preferred.

In another embodiment according to the invention, the molar ratio of carboxyl group to epoxy group is between 0.5 and 1.0, preferably between 0.8 and 1.0, especially preferably between 0.9 and 1.0. The polycycloaliphatic substance comprising a carboxyl group, however, may also be a reaction product of at least two compounds; in particular component (i) is one of the above-mentioned polycycloaliphatic compounds which has been additionally reacted further at elevated temperature with polycarboxylic acids and/or their anhydrides to form a half-ester.

In another embodiment according to the invention, the substance comprising a carboxyl group may have a refractive index of at least 1.480 at 20° C.

In this way, further improvements can be achieved with regard to the gloss of the finished clear coat layer without any negative effect on the other properties.

Especially suitable polycycloaliphatic compounds may include tricycloaliphatic monocarboxylic acids from the group of hydrogenated natural resin acids, e.g. commercial products such as Foral AX-E from the company Hercules BV, adamantane carboxylic acids; and tricyclic monocarboxylic acids derived from dicyclopentadiene such as tricyclodecane derivatives with a carboxyl group (TCD carboxylic acids), in particular tricyclo-[$5.2.1.0.^{2,6}$]decane-8 carboxylic acid, preferably tetrahydroabietic acid.

In another preferred embodiment of this invention, the polycycloaliphatic substance comprising a carboxyl group may be a reaction product of at least two compounds, at least one of which is a polycycloaliphatic compound having a refractive index of at least 1.460, preferably at least 1.480, at 20° C.

In particular, at least one of the polycycloaliphatic compounds having a refractive index of at least 1.460 or 1.480 at 20° C. may be comprised in an amount of at least 10 wt. %, preferably at least 20 wt. %, and in particular at least 50 wt. %, in the reaction product comprising a carboxyl group.

In particular, a tricycloaliphatic monoalcohol from the group of perhydrogenated natural resins such as perhydroabietyl alcohol; the dicyclopentadiene derivatives e.g. 8-hydroxytricyclo[$5.2.1.0.^{2,6}$]decane, 8-hydroxymethyltricyclo[$5.2.1.0.^{2,6}$]decane, 8-hydroxytricyclo[$5.2.1.0.^{2,6}$]dec-3-ene, 9-hydroxytricyclo[$5.2.1.0.^{2,6}$]dec-3-ene are suitable as polycycloaliphatic compound.

This monoalcohol reacts with a compound comprising a carboxyl group to form a half-ester during the production of the polycycloaliphatic substance comprising a carboxyl group.

Suitable compounds comprising a carboxyl group for this purpose are, in particular, dicarboxylic acids or their anhydride(s), for example from the group of succinic acid (anhydride), glutaric acid (anhydride), quinoline dicarboxylic acid (anhydride), furan dicarboxylic acid (anhydride), pyridine dicarboxylic acid (anhydride), phthalic acid (anhydride), hexahydrophthalic acid (anhydride), tetrahydrophthalic acid (anhydride), methyl hexahydrophthalic acid (anhydride), naphthalene dicarboxylic acid (anhydride) and maleic acid (anhydride).

The term "(anhydride)" as used here and below indicates that both the free acid and its anhydride are meant.

If the polycycloaliphatic compound to be used as the starting material for the reaction product is a polycycloaliphatic dicarboxylic acid or possible anhydride(s) thereof, such as e.g. those from the group of hydrogenated natural resin acids, adamantane carboxylic acids and tricyclic monocarboxylic acids derived from dicyclopentadiene, e.g. tricyclo[$5.2.1.0.^{2,6}$]decane-8 carboxylic acid, preferably tetrahydroabietic acid, then the alcohol may also be an aliphatic monohydric alcohol, e.g. methanol, ethanol, n-propanol, isopropanol, methoxypropanol, n-butanol, isobutanol, 2-ethyl-1-hexanol, 1-hexanol, a heptyl alcohol, a nonyl alcohol; a fatty alcohol, e.g. octanol, decanol, dodecanol, a glycol monoether, e.g. methyl glycol, ethyl glycol, butyl glycol, polyglycol monoether; an aromatic monohydric alcohol, e.g. benzyl alcohol; or a cycloaliphatic monohydric alcohol, e.g. cyclohexanol, cyclododecanol and/or cyclopentanol.

Here again, the reaction product is a half-ester, which is subsequently polymerized with the epoxy group originating from the glycidyl methacrylate.

However, the polycycloaliphatic substance comprising a carboxyl group may also comprise one or more aromatic compounds. This option will be selected when the gloss of the finished clear coat layer is to be increased even further.

Such an aromatic compound may preferably originate from the group of aromatic monocarboxylic acids such as naphthoic acid, benzenemonocarboxylic acids such as benzoic acid, o-toluic acid, m-toluic acid, p-toluic acid, hydroxybenzoic acid, tert-butylbenzoic acid, aromatic heterocyclic monocarboxylic acids such as pyridine carboxylic acids and furan carboxylic acids.

According to an especially preferred embodiment, the $C_2$–$C_4$-hydroxyalkyl acrylate or $C_2$–$C_4$ hydroxyalkyl methacrylate is selected from 2-hydroxyethyl (meth)acrylate and 4-hydroxybutyl (meth)acrylate.

Very good results are achieved with 2-hydroxyethyl methacrylate and 4-hydroxybutyl acrylate.

However, the invention is not limited to the use of $C_2$–$C_4$ hydroxyalkyl (meth)acrylates with primary hydroxyl groups. It is also possible to use $C_2$–$C_4$ hydroxyalkyl (meth)acrylates in which up to 50% of the primary hydroxyl groups are replaced by secondary hydroxyl groups.

Examples of $C_2$–$C_4$ hydroxyalkyl (meth)acrylates with secondary hydroxyl groups are 2-hydroxypropyl (meth)acrylate, 2-hydroxybutyl (meth)acrylate and hexanediol-1,6-mono(meth)acrylate.

All compounds which are in solution and not in the form of a dispersion under the reaction conditions are suitable for use as the fluorine-modified polymer. Examples of especially suitable fluorine-modified polymers are those based on fluorine-comprising vinyl ether with a fluorine content between 25% and 30%, a glass transition temperature between 16° C. and 45° C. and a hydroxyl value between 45 and 90. Such polymers are available commercially and are distributed, e.g. under the brand name "Lumiflon®" by the company Zeneca Resins.

The polycycloaliphatic substance comprising a carboxyl group may also additionally comprise one or more aromatic compounds, preferably from the group of aromatic polycarboxylic acids such as naphthoic acid, benzenemonocarboxylic acids such as benzoic acid, o-toluic acid, m-toluic acid, p-toluic acid, hydroxybenzoic acid, tert-butylbenzoic acid, aromatic heterocyclic monocarboxylic acids such as pyridine carboxylic acids and furan carboxylic acids.

If high demands are made regarding the resistance to weathering of the clear coat layer, no aromatic or heterocyclic monocarboxylic acids are used concurrently or the total amount of aromatic rings including vinyl aromatics, e.g. styrene, amounts to no more than 30 wt. %, based on the coating composition.

Component (i) can be obtained by reacting the starting compounds at an elevated temperature, e.g. 60° C. to 200° C., preferably 120° C. to 170° C. The reaction may be performed in the melt or in the presence of organic solvents such as those conventionally used in the production of paint or synthetic resins for paint, e.g. alcohols such as methoxy propanol, butanol, aromatic hydrocarbons, e.g. xylene, petroleum distillates based on alkylbenzenes, esters, e.g. butyl acetate, methoxypropyl acetate, ketones, e.g. butanone, methyl isobutyl ketone and mixtures thereof. If necessary, the conventional catalysts for catalyzing the epoxy/carboxy reaction may be used for this, e.g. alkali metal hydroxides, e.g. lithium hydroxide monohydrate, tertiary amines, e.g. triethylamine, N,N-benzylmethylamine, triethylbenzylammonium chloride, benzyltrimethylammonium chloride, as well as mixtures of different catalysts, usually in an amount of 0.1 to 2 wt. %, based on the total amount of the components. If the reactions are performed at an elevated temperature, e.g. 150° C. to 170° C., it is generally possible to omit catalysts. The modifying agents claimed may be added to the acrylic copolymer comprising epoxy groups before the reaction temperature or they may be added at the reaction temperature in portions gradually or continuously, taking into account the exothermic reaction also in the form of solutions, e.g. in organic solvents if they are soluble in the solvent or form a stable dispersion.

The amount of the polycycloaliphatic substance comprising a carboxyl group is selected, as mentioned above, so that the ratio of epoxy groups to carboxyl groups is usually 1:0.5 to 1:1 and depends mainly on the intended application and/or the use of the coating composition.

The reaction is generally terminated as soon as the acid number has dropped below 20, preferably amounts to 0 to 10. However, acrylic copolymers having a higher acid number, e.g. 25 to 50 may also be produced. The number-average molecular weight of component (i) may vary within wide limits and is preferably between 500 and 10,000, especially preferably between 700 and 5000, in particular 750 and 2000 (g/mole).

The acid number is between 0 and 50, preferably between 5 and 25 (mg KOH/g resin).

In principle, all blocked polyisocyanates can be used as crosslinking agents in which the isocyanate groups have been reacted with a compound so that the blocked polyisocyanate formed is stable with respect to the hydroxyl groups of the polymer at room temperature but will react at an elevated temperature, usually in the range of approximately 90 to 300° C. Any organic polyisocyanates suitable for crosslinking can be used for the production of the blocked polyisocyanates. Isocyanates comprising approx. 3 to approx. 36 carbon atoms, in particular approximately 8 to 15 carbon atoms, are preferred. Examples of suitable diisocyanates are the diisocyanates listed above.

Polyisocyanates with a higher isocyanate functionality may also be used. Examples include tris-(4-isocyanatophenyl)methane, 1,3,5-triisocyanatobenzene, 2,4,6-triisocyanatotoluene, 1,3,5-tris-(6-isocyanatohexyl)biuret, bis-(2,5-diisocyanato-4-methylphenyl)methane and polymeric polyisocyanates such as dimers and trimers of diisocyanatotoluene. Furthermore, mixtures of polyisocyanates may also be used.

The organic polyisocyanates that may be used as crosslinking agents in this invention may also be prepolymers which are derived from a polyol, for example, including a polyether polyol or a polyester polyol. To do so, it is known that polyols are reacted with an excess of polyisocyanates, thus forming prepolymers with terminal isocyanate groups. Examples of polyols that may be used for this purpose are simple polyols, e.g. glycols such as ethylene glycol and propylene glycol and other polyols such as glycerol, trimethylolpropane, hexanetriol and pentaerythritol; also monoethers such as diethylene glycol and dipropylene glycol as well as polyethers which are adducts of such polyols and alkylene oxides. Examples of alkylene oxides suitable for polyaddition onto these polyols to form polyethers include ethylene oxide, propylene oxide, butylene oxide and styrene oxide. These polyaddition products are generally referred to as polyethers with terminal hydroxyl groups. They may be linear or branched. Examples of such polyethers are polyoxyethylene glycol with a molecular weight of 1540, polyoxyproylene glycol with a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers may also be used. Particularly suitable polyether polyols are those obtained by reacting such polyols as ethylene glycol, diethylene glycol, triethylene glycol, 1,4-butanediol, 1,3-butanediol, 1,6-hexanediol and mixtures thereof; glycerol, trimethylolethane, trimethylolpropane, 1,2,6-hexanetriol, dipentaerythritol, tripentaerythritol, polypentaerythritol, methyl glycosides and sucrose with alkylene oxides such as ethylene oxide, propylene oxide or mixtures thereof.

Any suitable aliphatic, cycloaliphatic or aromatic alkyl monoalcohols may be used for blocking the polyisocyanates. Examples in this respect are aliphatic alcohols such as methyl alcohol, ethyl alcohol, chloroethyl alcohol, propyl alcohol, butyl alcohol, amyl alcohol, hexyl alcohol, heptyl alcohol, octyl alcohol, nonyl alcohol, 3,3,5-trimethylhexyl alcohol, decyl alcohol and lauryl alcohol; aromatic alkyl alcohols such as phenylcarbinol and methyl phenylcarbinol. Small amounts of higher molecular weight monoalcohols having a relatively low volatility may also be used if necessary, these alcohols acting as plasticizers in the coatings after they are split off.

Other suitable blocking agents are oxime such as methyl ethyl ketone oxime, acetone oxime and cyclohexanone oxime as well as caprolactams, phenols and hydroxamic acid esters. Preferred blocking agents include malonic ester, acetoacetate ester and β-diketones.

Methyl ethyl ketoxime and caprolactam are especially preferred.

The blocked polyisocyanates are produced by reacting the capping agent in a sufficient quantity with the organic polyisocyanate so that there are no longer any free isocyanate groups present.

The blocked aliphatic or cycloaliphatic polyisocyanate is preferably a blocked isophorone diisocyanate (IPDI, 3,5,5-trimethyl-1-isocyanato-3-isocyanatomethyl-cyclohexane) present in trimerized or biuret form and/or 2,4,6-trioxo-1,3,5-tris(6-isocyanatohexyl)hexahydro-1,3,5-triazine (Desmodur® N3300).

However, other suitable polyisocyanates may also be used, e.g. 1,3-bis(1-isocyanato-1-methylethyl)benzene (TMXDI, m-tetramethylxylylene diisocyanate) or 4,4'-dicyclohexylmethane diisocyanate (Desmodur® W).

The latter polyisocyanates must also be reacted with suitable blocking agents.

The choice of suitable blocking agent depends on the crosslinking temperatures. When using the clear coat layer according to the invention as a coil coating paint, methyl ethyl ketoxime or caprolactam is usually selected as the blocking agent.

However, there are also commercial blocked polyisocyanates such as for example those brought on the market by Bayer under the trade name Desmodur® BL 3175.

According to another particularly preferred embodiment of the present invention, the intermediate coat is obtainable by crosslinking a non-aqueous starting mixture comprising in turn:
(A) 60 to 90 wt. % of a non-aqueous solution of at least one cycloaliphatic polyester with an OH number between 20 and 150 and a glass transition temperature between 0 and 70° C. and a weight-average molecular weight between 750 and 7000; and
(B) 10 to 40 wt. % of at least one blocked aliphatic or cycloaliphatic polyisocyanate; the sum of components (A) and (B) being 100%, based on the binder content of the starting mixture.

Those polyesters which are obtainable on the basis of cycloaliphatics are particularly suitable for the production of intermediate coats resistant to weathering.

The thickness of the intermediate coat layer may be 10 to 25 µm in the crosslinked state, the thickness of the top-coat layer in the crosslinked state may be 10 to 25 µm.

In another embodiment which is also particularly preferred, the intermediate coat layer additionally comprises effect pigments, especially aluminum particles.

The term "effect pigment" is understood to include lamellar pigments usually used in effect coatings such as metal pigments, e.g. those of titanium, aluminum or copper; interference pigments such as metal oxide-coated metal pigments, e.g. aluminum coated with titanium dioxide or mixed oxides, coated mica, e.g. mica coated with titanium dioxide or mixed oxides, microtitanium dioxide and graphite effect pigments, lamellar iron oxide (micaceous iron oxide), molybdenum sulfide pigments, lamellar copper phthalocyanine pigments and bismuth oxychloride flakes, coated glass flakes.

The effect pigments are usually incorporated into the base-coat layer to produce a multilayer coating for the automotive industry. The problem here is that the color-imparting pigments cover the effect pigments and thus reduce their effect. In particular in the case of the metallic black tint, this effect causes a large proportion of the effect pigment having to be added to the base-coat. In addition, the visually perceivable effect is much greater if the effect pigments are present in the intermediate coat layer. It is thus possible for the first time to provide new possibilities in the use of effect pigments, in particular in the field of coloristics.

The intermediate coats and top-coats required for producing the clear coat layer according to the invention additionally comprise, besides the obligatory components, the solvents generally used in solution polymerization of acrylic copolymers and in the production of baked-on coatings; the solvents include aromatic hydrocarbons, e.g. xylene, esters, e.g. methoxypropyl acetate, ketones, e.g. butanone, methyl isobutyl ketone, alcohols, e.g. butanol, methoxypropanol, glycol monoether, e.g. butyl glycol and mixtures thereof, e.g. mixtures of primarily aromatic petroleum distillate solvents having a higher boiling point and butanol and they can be diluted with these solvents or solvent mixtures to the application viscosity.

The intermediate coat and/or the top-coat may optionally also comprise the usual additives and auxiliary substances for production of coatings such as:

surfactants, e.g. wetting agents and flow control agents based on silicone, e.g. polyether-modified dimethylpolysiloxane copolymers, fluorosurfactants;

rheological aids, e.g. anti-sagging agents (SCA-modified acrylic copolymers; SCA=sagging control agents);

thickeners or thixotropy agents, highly-dispersed silica, polyurethanes, high-viscosity acrylic copolymers with acrylic acid and/or methacrylic acid as the main effective copolymerising component; acid catalysts, e.g. phosphoric acid, acid half-esters of phosphoric acid with monohydric or dihydric alcohols, e.g. phosphoric acid monobutyl ester, half-esters of dicarboxylic cids and/or the anhydrides thereof with monohydric alcohols, e.g. maleic acid onobutyl ester, solutions of polyacids in suitable organic solvents, e.g. 20% olutions of maleic acid in methoxypropanol;

accelerators, e.g. tertiary amines, e.g. triethylamine, dibutyltin dioxide, ibutyltin dilaurate, metal alcoholates, e.g. aluminum isopropylate, butyl itanate, metal chelates of aluminum, zirconium or titanium, e.g. titanyl cetylacetonate;

light stabilizers, e.g. benzotriazole derivatives and HALS compounds (HALS=hindered amine light stabilizer);

additional crosslinking agents, in particular
  carboxy-functional components, preferably polycarboxylic acids or the anhydrides thereof, e.g. itaconic acid, citraconic anhydride, dodecanedioc acid, 2-dodecenedioc acid, dodecenylsuccinic anhydride, phthalic anhydride, tetrahydrophthalic anhydride, trimellitic anhydride, 1,2-, 1,3- and 1,4-cyclohexane dicarboxylic acid, hexahydrophthalic anhydride and/or mixtures thereof such as those generally used to harden polyepoxides, e.g. diepoxides based on bisphenol A, cycloaliphatic diepoxides, e.g. hexahydrophthalic acid diglycidyl ester, 3,4-epoxycyclohexylmethyl-3',4'-epoxycyclohexane carboxylate, acrylic copolymers comprising epoxide groups, with more than one, preferably two or more epoxide groups per average molecular weight, or polyacids which are half-esters obtained by reacting a polyol, e.g. 1,6-hexanediol, trimethylolpropane, with an acid anhydride, e.g. hexahydrophthalic anhydride, methyl hexahydrophthalic anhydride, such as those described in European Patent A 212 457, and carboxy-functional acrylic copolymers, e.g. those synthesized by using substantial quantities of (meth)acrylic acid in the synthesis of acrylic copolymers, e.g. with an acid number of 70 or higher as well anhydride acrylic copolymers, e.g. those produced by using maleic anhydride and/or itaconic acid in the production of acrylic copolymers, as described in European Patents A 358 306, A 316 873, as well as unsaturated or saturated polyesters comprising carboxyl groups, in particular those with a high acid number, e.g. 70 or more and/or aminoplastic substances which have satisfactory compatibility in terms of coating technology with the modified acrylic copolymers, aminoplastics etherified preferably entirely or partially with monohydric alcohols, in particular C1–C4 alcohols, e.g. urea and/or triazine-formaldehyde resins, in particular melamine-formaldehyde resins, benzoguanamine resins, e.g. tetramethoxybenzoguanamine, triazine-formaldehyde resins produced according to unexamined German Patent 42 37 515, e.g. by reacting 2,4-diamino-6-diethylaminotriazine, paraformaldehyde and butanol, hexamethoxymethylmelamine, hexamethylbutoxymethylmelamine, tetramethoxymethylglycoluril; in particular derivatives comprising carboxyl groups and derived from partially or entirely etherified aminoplastics such as those described in Unexamined German Patent 35 37 855, U.S. Pat. No. 3,519,627, U.S. Pat. No. 3,502,557 and U.S. Pat. No. 4,026,855; or the aminoplastics mentioned in the relevant literature (Karsten, Enamel Raw Material Tables, 9th edition, Curt R. Vincentz Verlag, Hannover, 1992, pp. 269–288; European Resin Directory 1983, European Resin Manufacturers Association, pp. 101–108); and/or TACT (tris(alkoxycarbonylamino)-1,3,5-triazine) such as tris(methoxycarbonylamino)-1,3,5-triazine, tris (butoxycarbonylamino)-1,3,5-triazine or mixtures thereof.

other binder components, preferably resins which are satisfactorily compatible with the intermediate coat and/or the top-coat from the standpoint of coating technology, in particular acrylic copolymers comprising carboxyl groups and hydroxyl groups and/or saturated or unsaturated polyesters comprising carboxyl groups and hydroxyl groups in subordinate amounts (1 to 30 wt. %), based on the solid binder.

The solids content of this coating composition in a ready-to-use form preferably amounts to at least 45 wt. %, in particular 50 wt. % or more.

The clear coat layer may be used in particular for coating precoated metal coils (coil coating). The intermediate coat layer and the top-coat layer are applied by using coating methods with which those skilled in the art are familiar. Particularly suitable methods include the rolling method and the casting head method.

With regard to the use of the clear coat layer for the production of precoated metal coils, this is used in multilayer coating. Such a multilayer coating suitable for the automotive industry is obtainable e.g. by the following procedure:

applying a primer layer to a pretreated metallic substrate and baking the same at a temperature between 180 and 260° C.;

applying a color-imparting base-coat layer and baking the same at a temperature between 180 and 260° C.;

producing a clear coat layer according to the invention (baking temperature of the intermediate coat and top-coat between 180 and 260° C.).

The coating agents that can be used to produce a primer layer and a base-coat layer in the aforementioned multilayer coating are available commercially, e.g. under the trademark Polycoat® CC-Primer from the company Bollig & Kemper.

The layer thicknesses of such as a multilayer coating, i.e., the thickness of the primer layer, the base-coat layer and the intermediate coat layer and top-coat layer in the crosslinked state are between 10 and 25 µm respectively.

Very uniform layer thicknesses are obtained by applying the individual layers by the so-called coil coating method. This yields a particularly uniform observable effect when using base-coats comprising effect pigments; such an effect could not be achieved in the past by spray application of a base-coat. The minor unavoidable differences in layer thickness which occur with a spray application are manifested in a difference in effect which is clearly observable visually.

The clear coat layer in the present case is especially preferably suitable for the production of automobile parts by deep drawing the metal coils precoated in the color of the vehicle since the clear coat layer according to the invention is characterized in particular by excellent deep drawing properties without any negative effect on the overall level of properties of the crosslinked coating.

The following examples are presented to illustrate this invention.

EXAMPLES

Production of an Intermediate Coat

In a 2-liter four-necked, round bottomed flask equipped with a heater, thermometers, agitator, column and water separator, a mixture of:

303.1 g hexahydrophthalic anhydride
254.6 g neopentyl glycol
8.1 g trimethylolpropane
17.6 g maleic anhydride
35.2 g adipic acid
0.5 g dibutyltin oxide is melted and heated gradually to 240° C. while constantly passing nitrogen through it. The water formed as a byproduct during the polycondensation process is removed continuously.

After reaching an acid number of less than 10 mg KOH/g and a viscosity of 55 to 65 seconds, measured according to DIN 53211 in a 4 mm beaker at 20° C. (50% in Solvesso 150), the mixture is cooled and diluted to a solids content of 60% at 120° C. using a mixture of 75.18 g dibasic ester, 152.86 g Solvesso 200 and 152.86 g methoxypropyl acetate.

Production of a Cycloaliphatic Acrylate Polymer

Into a 2-liter four-necked, round bottomed flask equipped with a heating device, thermometer, agitator, cooling attachment and gas inlet tube, 328.5 g Solvesso® 100, 87.6 g Veova® 9 and 5.8 g cumene hydroperoxide (80% delivery form in a ketone mixture) are placed as starting materials. While stirring and passing nitrogen through the mixture, it is heated to 140° C., and using a dripping funnel, a mixture of 284.5 g isobornyl methacrylate, 206.3 g 2-hydroxymethyl methacrylate, 2.3 g acrylic acid, 43 g ethyl-3,3-di(tert-amylperoxy)butyrate and 14.0 g Solvesso® 100 is metered in uniformly within four hours. One hour after the end of this addition, a mixture of 4 g ethyl-3,3-di(tert-amylperoxy) butyrate and 24.0 g Solvesso® 100 is added dropwise within 30 minutes. After another two hours, the mixture is cooled to 80° C. and filtered through a 30 µm screen. The resulting resin has an acid number of 4 mg KOH/g, a solids content of 60% and a viscosity of 40 to 60 seconds, measured according to DIN EN ISO 2431 in a 4 mm beaker at 20° C. (50% in Solvesso® 100).

Production of a Top-Coat

In a 2-liter metal mixing vessel, the following are mixed: 360 g of the acrylic copolymer described above are mixed with 140 g of a commercial fluoropolymer resin (Lumiflon® LF 552 from Zeneca Resins, a 60% solution in aromatic solvents).

Subsequently, 150 g of a commercial blocked aliphatic polyisocyanate (Desmodur® BL 3175 from Bayer AG), 175 g of a commercial blocked cycloaliphatic polyisocyanate (Vestanat® B 1370 from Degussa Hüls AG), 20 g of a UV absorber based on benzotriazole (Tinuvin® 1130 from Ciba Spezialitäten Chemie), 10 g of a HALS compound (Tinuvin® 292 from Ciba Spezialitäten Chemie), 3 g of a flow control agent based on acrylic copolymer (Disparlon® L1984 from Kusumoto Chemicals), 2 g dibutyltin dilaurate and 40 g butyl diglycol acetate are added.

After adding 10.0 parts by weight Solvesso® 150, the processing viscosity is adjusted to 80 seconds in the 4 mm DIN beaker at 20° C.

Production of a Base-Coat 560 g of a commercial polyester resin (Dynapol® LH830 from Degussa Hüls AG, 60 % dissolved in Solvesso® 150) is placed in a 2-liter metal mixing vessel. With the help of a suitable dispersing device (dissolver from Pendraulik), 5 g colloidal silica (Aerosil® R972 from Degussa AG) is dispersed. Adding 90 g of a commercial blocked aliphatic polyisocyanate (Desmodur® BL 3175 from Bayer AG) is done while stirring the addition of 5 g of a flow control agent based on acrylic copolymer (Disparlon® L1984 from Kusumoto Chemicals) and 2 g dibutyltin dilaurate (reaction accelerator) and 50 g Solvesso® 200S.

Then 90 g aluminum effect pigment (Alpate® 8160 from Alcan Toyo) is prepared to a paste in 100 g Solvesso®) 150 and added to the mixture described above after one hour.

The viscosity is adjusted to a value between 90 and 100 seconds (measured in the 4 mm DIN beaker at 20° C.) with approximately 9.8 parts by weight Solvesso® 150.

PRODUCTION OF THE TEST PANELS

Example According to the Invention

Chromated aluminum sheet metal conventionally used in the coil coating industry, having a sheet metal thickness of 0.58 mm and coated with a commercial anti-corrosion primer suitable for deep drawing Polycoat® 21-209-9544 CC-Primer from Bollig & Kemper) with a film thickness of 15 µm, is used as substrate for the application of the clear coat layer according to the invention.

The base-coat prepared previously is applied to this primer layer so as to yield a dry layer thickness of 15 µm. The base-coat layer is dried at a PMT (peak metal temperature) of 249° C. Subsequently, the intermediate coat described above is applied to this base-coat layer so that in the crosslinked state an intermediate coat layer with a dry layer thickness of 15 µm is obtained. This intermediate coat is also hardened at a PMT of 249° C.

Last of all, the top-coat described above is applied to this intermediate coat layer so that, in the crosslinked state, a top-coat layer having a dry layer thickness of 15 µm is obtained. This top-coat is also hardened at a PMT of 249° C.

The resulting multilayer coatings are tested for the following properties according to the test methods described below: adhesion, gloss, pencil hardness, cracking after bending, resistance to chemicals, waviness and Knoop hardness.

Table 1 shows the results of these tests.

Comparative Example (Three-Layer)

A multilayer coating operation corresponding to the example according to the invention is performed except that no intermediate coat layer is applied. In other words, only a top-coat layer with a layer thickness of 15 µm is applied to the base-coat layer.

This multilayer coating is tested for its properties like the multilayer coating according to the invention.

Table 1 shows the results of these tests.

Comparative Example (Four-Layer)

A multilayer coating operation corresponding to the example according to the invention is performed, except that the intermediate coat layer is produced by applying and crosslinking the top-coat described above. In other words, two identical clear coat layers of the same top-coat are applied to the base-coat layer with the same thickness (15 µm each).

This multilayer coating is investigated for its properties like the multilayer coating according to the invention.

Table 1 shows the results of these tests.

Testing for Adhesion after Swaging

The adhesion or intermediate adhesion was tested by using the method described in section T6 of the ECCA Testing Standard.

The coat layers applied to an aluminum substrate were provided with a grid cut (in accordance with DIN EN ISO 2409) and then were swaged by 8 mm with a swaging device which corresponds to the ISO Standard 1520-1973 at the rate stipulated for that test in that standard.

After shaping, the adhesion was determined by using an adhesive coil (Tesa 4104 transparent packing film). To do so, the adhesive film is applied to the shaped grid cut and then removed at high speed.

Testing the Gloss:

The gloss was determined according to the standards DIN 67539, ISO 2813 and ASTM D-523 using a gloss meter from the company Byk-Gardner at a measurement angle of 20°.

Testing the Pencil Hardness:

The coating surface is scratched at an angle of 45° with the help of pencils of increasing hardness. The hardness corresponds to that of the hardest pencil which will no longer penetrate into the surface of the coating. A set of pencils with the following degrees of hardness is used:

6B-5B-4B-3B-2B-B-HB-F-H-2H-3H-4H-5H-6H.

This test is usually performed by hand, but a mechanical device may also be used in which a force of 7.5 Newtons should be applied to the pencil.

This test is described in detail under ECCA-T4 in the ECCA test methods.

The reference standards for this are: ISO 3270-1984/ASTM D-3363-1974 (reapproved 1980).

Testing for Cracking after Bending (T-Bend Test):

The coated sheet metal panel is bent 3600 so that the coating film is facing outwards. Then it is clamped in a vice and pressed together tightly at the bending point (=>T0).

Using a magnifying glass with a tenfold magnification, the bend is examined for cracks. If cracks can be detected, the panel is bent around itself, so that the radius of the bend is increased by the thickness of the panel (=>T1).

This procedure is repeated until no more damage occurs. With each bending operation, the T value is increased by 0.5. The T value at which no more cracks can be detected is indicated.

This test is described in detail under ECCA-T7 in the ECCA test methods.

The reference standards for this are: EN2370:1991/EN ISO 1519:1995/EN ISO 6860:1995/ASTM D 5220-93a.

Testing of the Resistance to Chemicals of Coating Surfaces by Using a Gradient Oven:

A gradient oven developed by the company Byk-Mallinckrodt is used to heat, by means of a microprocessor-supported control, a single test sheet which has been coated with the multilayer coating to be tested in such a way that, after the end of the baking operation, a continuous range of selectable temperatures for physical tests is available.

Within a working range of +50° C. to +250° C., up to four different heating zones with a constant temperature may be set as desired.

To test for resistance to chemicals, the following procedure is used:

The gradient sheet metal is coated with the paint to be tested and baked.

The test chemicals (in line with the client specification) are applied to the coating film in rows of equal distance. Up to five chemicals may be applied to the sheet metal at the same time.

The test sheet is placed in the gradient oven, which has been preheated (client specifications) and this is closed.

After a treatment time of 30 minutes (client specification), the oven is opened and the temperature zones are printed out.

The sheet metal removed from the oven is cleaned under running water (client specification) and then evaluated.

The evaluation is performed once immediately and/or after 24 hours (client specification).

The assessment can take place according to different methods (client-specific):

in five categories: satisfactory, slightly swollen, swollen, coating damaged/coating detached or on the basis of the temperature at which no visible change in the coating surface subjected to stress can be discerned.

Examples of client specifications include the standard PA 15/050L of BMW and the standard PBODC 371 of Daimler Chrysler (Sindelfingen plant).

The Orange Peel Test (Waviness):

Wavy structures in the finished paint coat with a size of approximately 0.1 to 10 nm are referred to as orange peel.

Such effects are often evaluated visually, i.e., subjectively are described with terms such as "lumpy" or "grainy." We see orange peel as a pattern of light and dark fields. The recognizability of the structures depends on the observation distance.

Long waviness is discernible from a distance of approximately 3 m

Short waviness is visible only at a short distance (approximately 50 cm)

To describe this effect in figures, the Wave-Scan plus from Byk-Gardner is used.

The surface (wavy brightness pattern) is scanned optically using a laser point light source at an angle of 60° and a detector on the opposite side.

The measuring device is moved over a distance of 10 cm and the optical brightness profile is measured from point to point. The measurement signal is divided into two components:

Long waviness (structures>0.6 mm)

Short waviness (structures<0.6 mm)

The values required by the automotive industry are:

Long waviness: 4–7 (very good)

Short waviness: 18–22 (very good)

Testing the Knoop Impression Hardness:

The hardness of an organic coating was determined by means of a small load hardness tester (Leitz Miniload) from the company Leitz. Plastic deformation of the coating is determined by measuring the length of impression caused by a tool (diamond tip) having a specified shape (rhomboid shape) and dimensions under defined test conditions (exposure time, weight, temperature, etc.).

The length of impression is inversely proportional to the hardness of the coating film, i.e., the smaller the impression the harder is the coating surface and the greater is the numerical value of the Knoop hardness.

Further details (formulae for calculation, etc.) for the test conditions can be found in the documents for the Knoop hardness tester from the company Leitz.

TABLE 1

| | Example | Comparison 3-layer | Comparison 4-layer |
|---|---|---|---|
| Gloss | 85 | 82 | 85 |
| Long waviness | 5.4 | 7 | 5.4 |
| Short waviness | 21 | 23 | 21 |
| Knoop hardness | 23 | 23 | 23 |
| T-bend test | 1.0 | 1.5 | 1.5 |
| Adhesion | OK | OK | complete separation |
| Resistance to chemicals | | | |
| to tree resin (45° C.)* | 57° C. | 57° C. | 57° C. |
| to deionized water (>80° C.)* | >80° C. | >80° C. | >80° C. |
| to pancreatin (60° C.)* | 70° C. | 70° C. | 70° C. |
| to sulfuric acid 1% (56° C.)* | 60° C. | 60° C. | 60° C. |
| to sodium hydroxide solution 10% (>80° C.)* | >80° C. | >80° C. | >80° C. |
| to fuel (okay)* | OK | OK | OK |

*Values in parentheses are current specifications from the automotive industry

Table I shows clearly that the clear coat layer according to the invention meets all the requirements of the automotive industry and has even better properties with regard to gloss and appearance in comparison with a three-layer coating, and adhesion is significantly improved in comparison with a four-layer coating with two identical unpigmented coat layers.

What is claimed is:

1. Clear coat layer obtainable by
   (I) applying an unpigmented intermediate coat to a substrate to be coated or to a color-imparting base-coat layer,
   (II) crosslinking the intermediate coat and forming an intermediate coat layer,
   (III) applying an unpigmented top-coat to the intermediate coat layer, and
   (IV) crosslinking the top-coat and forming a top-coat layer, the intermediate coat layer having a greater flexibility than the top-coat layer.

2. Clear coat layer according to claim 1, characterized in that step (1) is performed by applying an unpigmented intermediate coat to a color-imparting base-coat layer.

3. Clear coat layer according to claim 2, characterized in that the color-imparting basecoat layer is situated on a primer layer.

4. Clear coat layer according to claim 1, characterized in that the flexibility of the intermediate coat layer is between T0 and T2, determined according to the T-bend test.

5. Clear coat layer according to claim 1, characterized in that the flexibility of the top-coat layer is between T0.5 and T5, determined according to the T-bend test.

6. Clear coat layer according to claim 1, characterized in that the value of the flexibility of the top-coat layer, determined according to the T-bend test, is higher by 0.5 and 4 units, in particular by at least two units, than that of the intermediate coat layer.

7. Clear coat layer according to claim 1, characterized in that the top-coat is obtainable by polyaddition of a non-aqueous starting mixture comprising:
   (A) 10 wt. % to 70 wt. % of a non-aqueous solution of a polymer based on acrylate with an OH number between 100 and 250,
   (B) 10 wt. % to 70 wt. % of a non-aqueous solution of a fluorine-modified polymer having a glass transition temperature between 20 and 40° C., and
   (C) 20 wt. % to 60 wt. % of at least one blocked aliphatic or cycloaliphatic polyisocyanate,
the weight ratio of component (A) to component (B) amounting to at most 1, and the sum of the components (A), (B), and (C) amounting to 100%, based on the binder content of the starting mixture to be crosslinked.

8. Clear coat layer according to claim 7, characterized in that component (A) is obtainable by radical polymerization of a monomer mixture comprising:
   (i) 030 wt. % to 60 wt. % of at least one polycycloaliphatic compound with at least two rings and a refractive index of at least 1.460 at 20° C.,
   (ii) 25 wt. % to 70 wt. % of at least one $C_2$–$C_4$ hydroxyalkyl (meth)acrylate with primary hydroxyl groups, and
   (iii) 0.1 to 1 wt. % acrylic acid,
the sum of components (i), (ii), and (iii) amounting to 100 wt. %, based on the monomer mixture.

9. Clear coat layer according to claim 8, characterized in that the monomer mixture additionally comprises 5 wt. % to 25 wt. % of a vinyl ester of a branched monocarboxylic acid having an average of 9 carbon atoms.

10. Clear coat layer according to claim 8, characterized in that the polycycloaliphatic compound is isobornyl methacrylate.

11. Clear coat layer according to claim 8, characterized in that the polycycloaliphatic compound of component (i) is selected from an acrylic copolymer obtainable by modifying an acrylic copolymer having at least one epoxy group with a polycycloaliphatic substance comprising a carboxyl group and having at least two rings with a refractive index of at least 1.460 at 20° C., the epoxy group originating from glycidyl methacrylate.

12. Clear coat layer according to claim 11, characterized in that the molar ratio of carboxyl group to epoxy group is between 0.5 and 1.0, preferably between 0.8 and 1.0, especially preferably between 0.9 and 1.0.

13. Clear coat layer according to claim 12, characterized in that the polycycloaliphatic substance comprising a carboxyl group comprises a polycycloaliphatic compound which has been additionally further reacted at elevated temperature with polycarboxylic acids and/or their anhydrides to form a half-ester.

14. Clear coat layer according to claim 11, characterized in that the substance comprising a carboxyl group has a refractive index of at least 1.480 at 20° C.

15. Clear coat layer according to claim 11, characterized in that the polycy cloaliphatic substance comprising a carboxyl group is a tricycloaliphatic monocarboxylic acid from the group of hydrogenated natural resin acids, adamantane carboxylic acids, and tricyclic monocarboxylic acids derived from dicyclopentadiene, such as tricyclo[$5.2.1.0.^{2,6}$] decanee-8 carboxylic acid, preferably tetrahydroabietic acid.

16. Clear coat layer according to claim 11, characterized in that the polycy cloaliphatic substance comprising a carboxyl group is a reaction product of at least two compounds, at least one of which is a polycycloaliphatic compound having a refractive index of at least 1.460, preferably at least 1.480, at 20° C.

17. Clear coat layer according to claim 16, characterized in that at least one of the polycycloaliphatic compounds having a refractive index of at least 1.480 at 20° C. is comprised in an amount of at least 10 wt. %, preferably at least 20 wt. % and in particular at least 50 wt. %, in the polycycloaliphatic reaction product comprising a carboxyl group.

18. Clear coat layer according to claim 16, characterized in that the polycycloaliphatic compound is a tricycloaliphatic monoalcohol from the group of perhydrogenated natural resins, such as perhydroabietyl alcohol, the dicyclopentadiene derivatives, such as 8-hydroxytricyclo [$5.2.1.0.^{2,6}$]decane, 8-hydroxymethyltricyclo-[5.2.1.0.2,6] decane, 8-hydroxytricyclo[$5.2.1.0.^{2,6}$]dec-3-ene, 9-hydroxytricy-clo[$5.2.1.0.^{2,6}$]dec-3-ene.

19. Clear coat layer according to claim 16, characterized in that the polycycloaliphatic compound is a dicarboxylic acid and its anhydride from the group of hydrogenated natural resin acids: adamantane carboxylic acids, and tricyclic monocarboxylic acids derived from dicyclopentadiene, e.g. tricyclo[$5.2.1.0.^{2,6}$]decane-3 carboxylic acid, preferably tetrahydroabietic acid.

20. Clear coat layer according to claim 11, characterized in that the polycycloaliphatic substance comprising a carboxyl group additionally comprises one or more aromatic compounds.

21. Clear coat layer according to claim 20, characterized in that the aromatic compound is selected from the group of aromatic monocarboxylic acids such as naphthoic acid; benzenemonocarboxylic acids such as benzoic acid, o-toluic acid, m-toluic acid, ptoluic acid, hydroxybenzoic acid, tert-butylbenzoic acid, aromatic heterocyclic monocarboxylic acids such as pyridine carboxylic acids and furan carboxylic acids.

22. Clear coat layer according to claim 8, characterized in that the$C_2$–$C_4$ hydroxyalkyl (meth)acrylate is selected from 2-hydroxyethyl(meth)acrylateand 4-hydroxybutyl (meth) acrylate.

23. Clear coat layer according to claim 8, characterized in that up to 50% of the primary hydroxyl groups of the$C_2$–$C_4$ hydroxyalkyl (meth)acrylate are replaced by secondary hydroxyl groups.

24. Clear coat layer according to claim 23, characterized in that the C2 to C4 hydroxyalkyl (meth)acrylate is selected from 2-hydroxypropyl (meth)acrylate, 2-hydroxybutyl (meth)acrylate and hexanediol-1,6-mono(meth)acrylate.

25. Clear coat layer according to claim 7, characterized in that the fluorinemodified polymer is a polymer based on fluorine-comprising vinyl ether with a fluorine content between 25 and 30%, a glass transition temperature between 16 and 45° C. and a hydroxyl value between 45 and 90.

26. Clear coat layer according to claim 7, characterized in that the blocked aliphatic or cycloaliphatic polyisocyanate is a blocked isophorone diisocyanate (IPDI, 3,5,5-trimethyl-1-isocyanato-3-isocyanatomethylcyclohexane)and/or 2,4,6-trioxo-1,3,5-tris(6-isocyanatohexyl)hexahydro-1,3,5-triazine present in trimerized form or in biuret form.

27. Clear coat layer according to claim 1 characterized in that the intermediate coat is obtainable by crosslinking a non-aqueous starting mixture comprising:
   (A) 60 to 90 wt. % of a non-aqueous solution of at least one cycloaliphatic polyester with an OH number between 20 and 150 and a glass transition temperature between 0 and 70° C. and a weight-average molecular weight between 750 and 7000, and (B) 10 to 40 wt. % of at least one blocked aliphatic or cycloaliphatic polyisocyanate, the sum of components (A) and (B) being 100%, based on the binder content of the starting mixture.

28. Clear coat layer according to claim 1 characterized in that the thickness of the intermediate coat layer in the crosslinked state is 10 to 25 μm.

29. Clear coat layer according to claim 1 characterized in that the thickness of the top-coat layer in the crosslinked state is 10 to 25 μm.

30. Clear coat layer according to claim 1 characterized in that the intermediate coat layer additionally comprises effect pigments, in particular aluminum particles.

31. Clear coat layer obtainable by (I) applying an unpigmented intermediate coat to a substrate to be coated, (II) crosslinking the intermediate coat and forming an intermediate coat layer, (III) applying an unpigmented top-coat to the intermediate coat layer, and (IV) crosslinking the top-coat and forming a top-coat layer, the intermediate coat layer having a greater flexibility than the top-coat layer.

32. A method of preparing a clear coat layer comprising:

(I) applying an unpigmented intermediate coat to a substrate to be coated or to a color-imparting base-coat layer;

(II) crosslinking the intermediate coat and forming an intermediate coat layer, (III) applying an unpigmented top-coat to the intermediate coat layer, and (IV) crosslinking the top-coat and forming a top-coat layer, the intermediate coat layer having a greater flexibility than the top-coat layer.

33. A method of preparing a multilayer coating comprising:

(1) applying a primer layer to a pretreated metallic substrate and baking the same at a temperature between 180 and 260° C.;

(2) applying a color-imparting base-coat layer and baking the same at a temperature between 180 and 260° C.; and (3) applying a clear coat layer by applying an unpigmented intermediate coat to the substrate to be coated, crosslinking the intermediate coat and forming an intermediate coat layer, applying an unpigmented top-coat to the intermediate coat layer, and crosslinking the top-coat and forming a top-coat layer;

the intermediate coat layer having a greater flexibility than the top-coat layer.

* * * * *